(12) United States Patent
Rykowski et al.

(10) Patent No.: US 6,975,775 B2
(45) Date of Patent: Dec. 13, 2005

(54) STRAY LIGHT CORRECTION METHOD FOR IMAGING LIGHT AND COLOR MEASUREMENT SYSTEM

(75) Inventors: Ronald F. Rykowski, Woodinville, WA (US); Douglas F. Kreysar, Duvall, WA (US)

(73) Assignee: Radiant Imaging, Inc., Duvall, WA (US)

( * ) Notice: Subject to any disclaimer, the term of this patent is extended or adjusted under 35 U.S.C. 154(b) by 652 days.

(21) Appl. No.: 10/092,108

(22) Filed: Mar. 6, 2002

(65) Prior Publication Data

US 2003/0169345 A1 Sep. 11, 2003

(51) Int. Cl.[7] ............................................... G06K 9/40
(52) U.S. Cl. ..................... 382/254; 382/274; 358/518
(58) Field of Search ................ 382/165, 167, 382/169, 274, 275; 358/2.1, 3.01, 3.03, 3.26, 358/3.27, 518

(56) References Cited

U.S. PATENT DOCUMENTS

| 3,792,485 | A | | 2/1974 | Strauss |
| 4,526,470 | A | | 7/1985 | Kaye |
| 4,654,794 | A | * | 3/1987 | O'Brien ...................... 433/215 |
| 6,172,690 | B1 | * | 1/2001 | Angulo et al. ................ 347/19 |
| 6,332,047 | B1 | * | 12/2001 | Sebborn et al. ............. 382/298 |
| 6,358,047 | B2 | * | 3/2002 | Lehmann ...................... 433/26 |
| 6,370,406 | B1 | * | 4/2002 | Wach et al. ................. 600/310 |
| 6,507,624 | B1 | * | 1/2003 | Jachim et al. ............... 375/316 |

* cited by examiner

Primary Examiner—Sanjiv Shah
Assistant Examiner—Yosef Kassa
(74) Attorney, Agent, or Firm—Stetina Brunda Garred & Brucker

(57) ABSTRACT

A stray light correction method for image light and color measurement system, uses a solid-state light detector array such as a charge-coupled device to record an image, so that a gray level value for each pixel of the solid-state light detector array is obtained. An average gray level value of the solid-state light detector array is calculated based on the gray level value for each pixel. The average gray level value is further multiplied with a stray light factor to obtain a correction value. The gray level value of each pixel is then subtracted with the correction value, such that the stray light effect can be eliminated.

21 Claims, 2 Drawing Sheets

Object to be measured with bright and dark areas, GA is average gray value for entire image

STRAY LIGHT CORRECTION METHOD FOR IMAGING LIGHT AND COLOR MEASUREMENT SYSTEM

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The present invention relates generally to a stray light correction method for imaging light and color measurement.

Charge coupled devices (CCD's) have been broadly applied in scanners and digital cameras to quantifiably measure luminance, illuminance and color coordinates of light sources or any illuminated object. In a charge coupled device camera, a light sensitive charge coupled device and a lens are incorporated. The image of an object or a light source to be measured is then focused onto the charge coupled device by the lens.

Since such charge coupled devices are very sensitive to light, stray light emitted from a region other than the object or the light source is often measured or recorded thereby. The sources of such stray light include the following:
1. The lens: Fresnel reflection or surface imperfections.
2. The interior walls of the lens barrel.
3. The glass window typically placed in front of the charge coupled device.
4. Reflected light from the surface of the charge coupled device passing back through the glass window and lens, from where it may scatter back onto the charge coupled device.
5. Reflected light from the surface of the charge coupled device that may scatter onto the inside walls of the charge coupled device chamber; and
6. External scattered light (for example, auto headlamp on curved wall, or light from one portion of wall scattered to another portion of wall and then into camera).

Such stray light ultimately returns, i.e., lands back on the charge coupled device in some unknown location that is not necessarily related to the corresponding position on the object from which it was emitted. For example, if a camera is capturing an image of a display with a checkerboard pattern of light and dark squares, some light will land on the charge coupled device corresponding to the focused position of a dark square, even though no light was actually emitted therefrom.

This stray light causes an inaccuracy when a charge coupled device is used to make quantifiable color, illuminance, or luminance measurement. While measuring illuminance or luminance, if the object being measured is highly non-uniform such as the checkerboard pattern or an automotive headlamp beam pattern, the stray light will tend to cause the measured light levels in darker regions of the object to be higher than they actually are.

One well-known method for accomplishing color measurement is to image a test area or a light source through two or more CIE matching filters. Again, if the object is significantly non-uniform while being viewed through one or more of the filters, stray light may contribute to inaccurate relative light levels for a specific filter. Since color coordinates are computed from the relative light levels of the matching filters, if the measurement is too high at a given location for a specific filter due to stray light, the particular color coordinate is not accurate at that particular location.

As an example of the above color measurement procedure, if an object with a red region and a blue region is measured by a camera with a charge coupled device, then as the blue measurement is performed, only light from the blue region of the object should land on the corresponding area of the charge coupled device. But due to stray light, some of the blue light may land on the charge coupled device corresponding to the red region of the object. This results in an inaccurate color coordinate for the red region because the measured value for the blue filter is too high.

BRIEF SUMMARY OF THE INVENTION

The present invention provides a stray light correction method for an imaging light and color measurement system. In the stray light correction method, an image is recorded using solid-state light detector array such as a CCD, so as to obtain a gray level value for each pixel of the solid-state light detector array. An average gray level value of the image recorded by the solid-state light detector array is calculated according to the gray level values obtained for all the pixels of the solid-state light detector array. The average gray level value is multiplied with a stray light factor to obtain a correction value. The correction value is subtracted from the gray level value of each pixel.

In the above stray light correction method, the stray light factor is obtained by the following steps. A test image is recorded using the solid-state light detector array. A reference measurement on a high-brightness region of the test image and a reference measurement on a low-brightness region of the test image is obtained. The test image is compared with the reference measurements of the high- and low-brightness regions to compute a stray light factor.

Software is employed to automatically correct the stray light when an image is recorded using a solid-state light detector array. Correction values for various solid-state light detector array measurement systems (i.e., CCD, lens, and filter combinations) are stored in the software. By entering the specific solid-state light detector array system used to record the image, the corresponding correction value is automatically provided. Once an image is recorded, the gray level value at each pixel of the image is subtracted with the correction value to eliminate the stray light effect.

A first order correction to the stray light assumes that the stray light is uniformly scattered across the entire solid-state light detector array and the amount thereof is proportional to the light incident through the lens onto the solid-state light detector array. Consequently, a uniform increase of gray level value is resulted at each pixel of the solid-state light detector array. Therefore, by subtracting the measured gray level value with a unique value (correction value), the stray light effect can be eliminated. This first order correction method may yield accurate measurement results in cases where the object being measured consists of smooth varying luminance levels or many small areas of high and low luminance levels.

For measurements where the object being measured consists of larger areas of high and low luminance levels that are not smoothly varying, it is necessary to use several unique correction values for various regions of the object being measured because the stray light will not be uniformly scattered across the entire solid-state light detector. In this scenario, different areas of the solid-state light detector experience different levels of increased gray level value from stray light, and therefore different unique correction values need to be subtracted from different areas of the solid-state light detector in order to eliminate the stray light effect.

BRIEF DESCRIPTION OF THE DRAWINGS

These, as well as other features of the present invention, will become more apparent upon reference to the drawings wherein.

DETAILED DESCRIPTION OF THE INVENTION

By way of background, to eliminate the stray light effect, an assumption is made according to the characteristics and the sources of the stray light in the present invention. The assumption comprises that the amount of stray light is directly proportional to the brightness of light incident on the solid-state light detector array, that is, the average gray level value measured by the solid-state light detector array. Because the stray light is partially caused by the lens and partially caused by the optional elements in the imaging light and color meter used to modify the spectral power distribution of incoming light for each instance of irradiation of the solid-state light detector array in a single color measurement, the amount of stray light is dependent on both the lens and the optical elements. Examples for the optical elements include a plurality of filters, a single tunable color filter, a plurality of tunable color filters, an interferometer, an interference grating, a plurality of solid-state light detector array for different spectra of incident light, a spectrally tunable mirror or micromirror device, a dispersive element such as a prism or holographic grating, a spectrograph, or a liquid crystal on crystal (LCOS). In the preferred embodiment of the present invention, color-matching filters corresponding to CIE 1931 X, Y, and Z tristimulus values are used as the optical elements designed to modify the spectral power distribution of the light incident on the solid-state light detector array, and a CCD is used as the solid-state light detector array.

As an example of the stray light effect, if a single star is being measured by the solid-state light detector array against an otherwise dark sky, the star will be focused on the solid-state light detector array, and will create a very high gray level at some very small region. However, the average gray level would be very low due to the wide range of the dark sky. The very low average gray level indicates a low level of stray light. In contrast, if a bright object with a small black spot is measured, a large amount of stray light is resulted due to the very large amount of light passing through the lens. The large amount of stray light causes the dark spot to be much brighter than it actually is.

Figure 1:
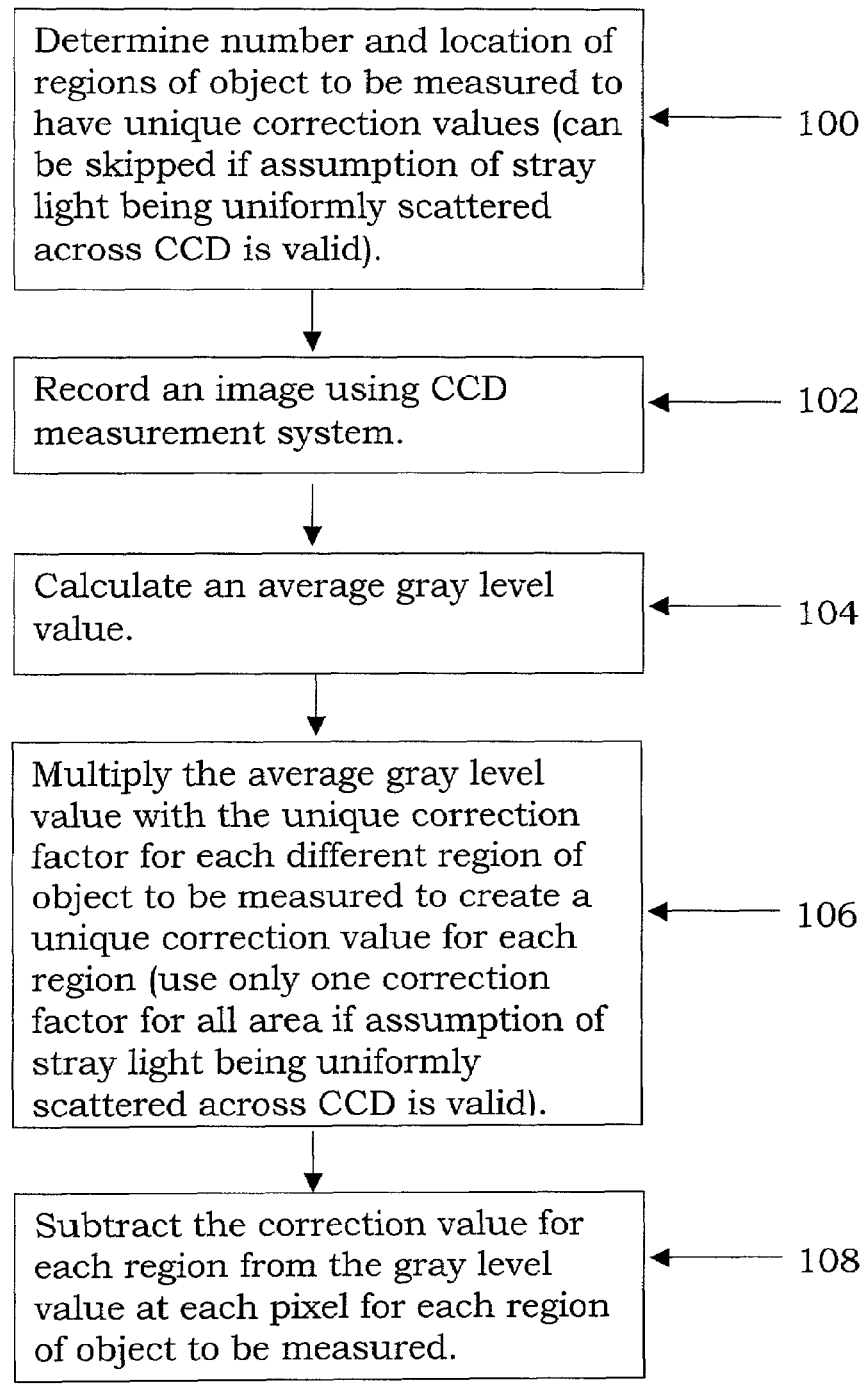
FIG. 1 shows a flowchart of the stray light correction method provided by the invention.

In the present invention, the method to eliminate the stray light effect and correct the image obtained by a solid-state light detector array includes post-processing the image in a software. A flowchart of the correction method is shown in FIG. 1. In FIG. 1, a determination is made on the number and location separate regions for unique correction factors in step 100. This is required only if the stray light incident on the solid-state light detector array is not uniformly spread across the solid-state light detector array. That is, when the stray light is not uniformly spread across the solid-state light detector array, the solid-state light detector array may be partitioned into several regions, and each of which has to be corrected with a unique stray light correction factor. To make the determinations of the step 100, it may be necessary to use the solid-state light detector array measurement device with no stray light correction to measure the luminance and color of an object and then compare the solid-state light detector array measurement to the measurement from a reference luminance or illuminance meter. In step 102, an image is recorded using a solid-state light detector array. In step 104, an average gray level value for the image recorded and measured by the solid-state light detector array is calculated. The average gray level value is calculated from the gray level values obtained at all the pixels of the solid-state light detector array. In step 106, the average gray level value is then multiplied with each different stray light factor to determine a correction value for each different region determined in step 100. In step 108, the appropriate correction value is then subtracted from the gray level value measured at each pixel of the solid-state light detector array for each different region in step 108, so that the stray light effect is eliminated.

The amount of stray light is dependent on the combination of each lens and optical elements in the imaging light and color meter used to modify the spectral power distribution of incoming light for each instance of irradiation of the solid-state light detector array in a single color measurement used in the imaging light and color measurement system. The stray light factor can be a unique value for each lens and optical element combination. Other optical devices such as a neutral density filter, while applied to the solid-state light detector array, may also affect the value of the stray light factor.

To determine the stray light factor of a solid-state light detector array with a lens/optical element combination, a test image is recorded. Preferably, the test image comprises high-contrast regions, a pattern that comprises a low-brightness regions and a high-brightness region such as a checkerboard pattern on a display, or an automotive headlamp beam pattern. Using a reference luminance or illuminance meter, a reference measurement in the high-brightness region, and a reference measurement in the low-brightness region is obtained. If different regions of the object to be measured will have different stray light factors (determined in step 100 of FIG. 1), then this process will be repeated for each region. For each region, the recorded test image is compared to the high-brightness reference measurement and the low-brightness reference measurement to compute the stray light factor. For each solid-state light detector array with a specific combination of lens and optical elements, this process is repeated to obtain the corresponding stray light factors specific to the configuration.

Figure 2:
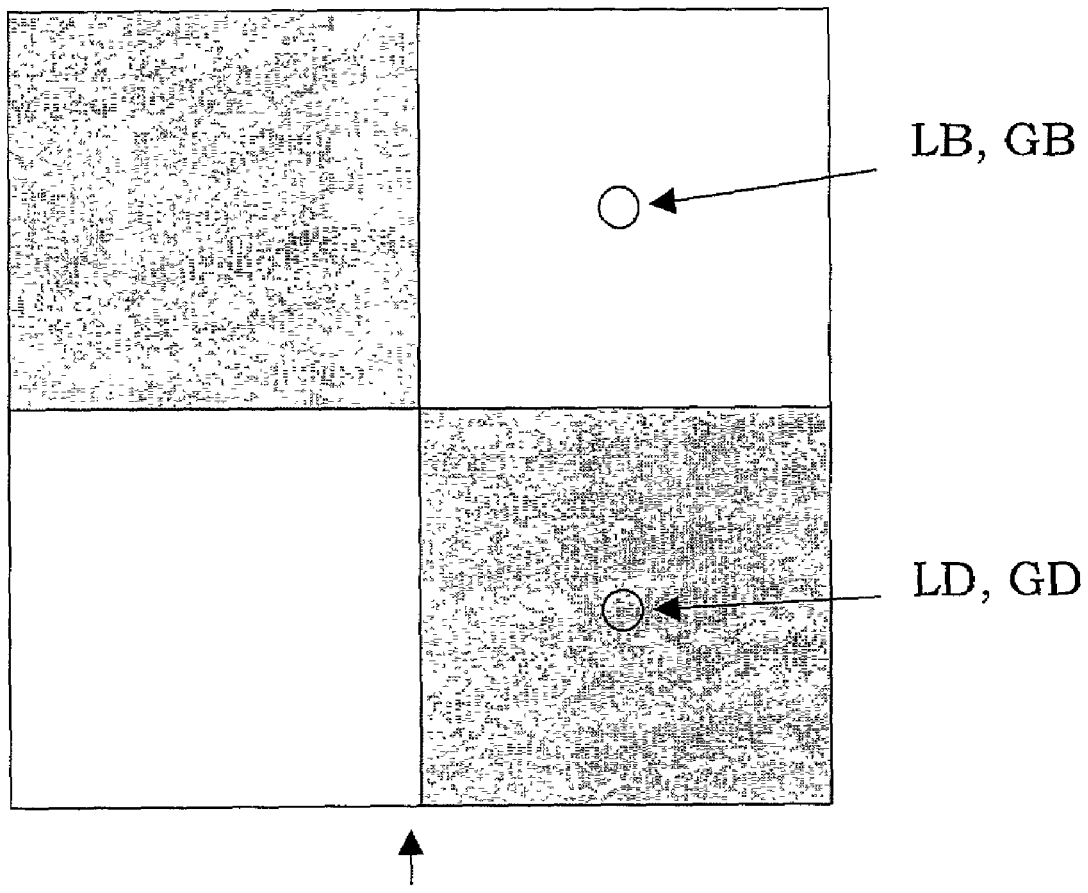
FIG. 2 shows an exemplary test image with high brightness and low brightness regions.

The calculation model for the computation of the stray light factor proceeds as follows. Referring to FIG. 2, the luminance (illuminance) value as measured by the reference luminance (illuminance) meter at a point in the high brightness region of the object to be measured shall be noted as LB. The value as measured by the reference luminance meter at a point in the low brightness region will be noted as LD. The gray level value as recorded by the solid-state light detector array at the point in the high brightness region corresponding to LB shall be noted as GB. The gray level value corresponding to LD shall be noted as GD. The average gray value of the object to be measured in noted as GA. From LB, LD, GB and GD, and "error" amount is calculated which corresponds to the amount of gray value GD which is caused due to stray light. If there were no stray light error in the solid-state light detector array measurement system, the following relationship should hold:

$$GD/GB=LD/LB$$

When there is stray light present, the gray level in the dark region measures higher than with a luminance meter, so that GD/GB>LD/LB. The error is calculated using the equation:

$$Error=GD-GB*(LD/LB)$$

From the error amount and average gray level, GA, the stray light factor is calculated:

$$Stray\ Light\ Factor=Error/GA$$

For measurements where the stray light is assumed to be uniformly spread across the solid-state light detector array a single stray light factor for each solid-state light detector with the specific combination of lens and optical elements is entered into the software to perform the correction method. After selecting between different solid-state light detector array and combination of lens and optical elements, the stray light factor of such combination can be obtained from the software. While an image is recorded by the solid-state light detector array system, the correction value for each image captured is automatically captured by the software. The software then automatically subtracts the gray level value of the recorded image obtained at each pixel of the solid-state light detector array with the correction value. For measurements where the stray light cannot be assumed to be uniformly spread across the solid-state light detector array, several stray light factors for each solid-state light detector array with the specific combination of lens and optical element is entered into the software to perform the correction method. These factors will be dependent on the bright and dark locations of the object to be measured and must be changed if the bright and dark locations of the object to be measured is changed; however, many measurements are made in environments where the identical test pattern is measured repeatedly (e.g., production testing facilities), so that this constraint does not reduce the utility of the invention.

The present invention allows the user to simply enter the reference measurements made in both the high and low brightness regions of the test image, the software can then automatically compute the ideal stray light factor to minimize the error at all locations.

Indeed, each of the features and embodiments described herein can be used by itself, or in combination with one or more of other features and embodiment. Thus, the invention is not limited by the illustrated embodiment but is to be defined by the following claims when read in the broadest reasonable manner to preserve the validity of the claims.

What is claimed is:

1. A stray light correction method for an imaging light and color measurement system, comprising:
   recording an image using a solid-state light detector array, so as to obtain a gray level value at each pixel of the solid-state light detector array;
   calculating an average gray level value of the image recorded by the solid-state light detector array;
   multiplying the average gray level value of the image recorded by the solid-state light detector array; and
   subtracting the correction value from the gray level of each pixel.

2. The stray light correction method according to claim 1, wherein the stray light factor is obtained by:
   recording a test image using the solid-state light detector array;
   obtaining a reference measurement on a high-brightness region of the test image;
   obtaining a reference measurement on a low-brightness region of the test image;
   comparing the test image with the reference measurements of the high- and low-brightness regions; and
   computing the stray light factor according to the comparison results.

3. The stray light correction method according to claim 2, wherein the steps of obtaining the reference measurements of the high- and low-brightness regions include obtaining luminance values LB, LD and gray level values GB, GD of the high- and low-brightness regions, respectively.

4. The stray light correction method according to claim 3, further comprising calculating the stray light factor by [GD−GB*(LD/LB)]/GA, where GA is an average gray level value of the test image.

5. The stray light correction method according to claim 2, wherein the step of recording a test image includes recording an image with high-contrast regions.

6. The stray light correction method according to claim 2, wherein the step of recording a test image includes recording an image with a checkerboard pattern.

7. The stray light correction method according to claim 2, wherein the step of recording a test image includes recording an image with an automotive headlamp beam pattern.

8. The stray light correction method according to claim 2, wherein the step of recording a test image includes recording an image with an automotive headlamp beam pattern.

9. The stray light correction method according to claim 1, wherein the stray light factor for each of the pixels is identical when a stray light incident on the image light and color measurement system is uniform.

10. The stray light correction method according to claim 1, wherein the solid-state light detector array is partitioned into a plurality of regions when a stray light incident on the image light and color measurement system is non-uniform, and each of the regions has a unique stray light factor.

11. The stray light correction method according to claim 10, wherein the solid-state light detector array is a charge-coupled device (CCD).

12. A stray light correction method for an imaging light and color measurement system, comprising:
    activating a software, in which a plurality of correction values for various combinations of solid-state light detector arrays/lens/optical elements used for color measurement are stored;
    recording an image using the specific combination of a solid-state light detector array/lens/optical elements used for color measurement entered to the software, to obtain a recorded image with a gray level value at each pixel of the solid-state light detector array;
    wherein the software automatically subtracts each gray level value with a correction value corresponding to the specific combination of a solid-state light detector array/lens/optical elements used for color measurement.

13. The stray light correction method according to claim 12, wherein the correction value is obtained by multiplying an average gray level value of the gray level value at each pixel with a stray light factor.

14. The stray light correction method according to claim 12, wherein the stray light factor is obtained by:
   recording a test image using the specific combination of a solid-state light detector array/lens/optical elements for color measurement;
   obtaining a reference measurement on a high-brightness region of the test image;
   obtaining a reference measurement on a low-brightness region of the test image;
   comparing the test image with the reference measurements of the high- and low-brightness regions; and
   computing the stray light factor according to the comparison results.

15. The stray light correction method according to claim 14, wherein the step of recording a test image includes recording an image with high-contrast regions.

16. The stray light correction method according to claim 14, wherein the step of recording a test image includes recording an image with a checkerboard pattern.

17. The stray light correction method according to claim 14, wherein the step of recording a test image includes recording an image with an automotive headlamp beam pattern.

18. The stray light correction method according to claim 14, wherein the solid-state light detector array is a charge-coupled device.

19. The stray light correction method according to claim 14, wherein the optical elements used for color measurement are color-matching filters corresponding to CIE 1931 X, Y and Z tristimulus values.

20. The stray light correction method according to claim 12, further comprising the following steps:
   determining whether a stray light incident into the imaging light and color measurement system is uniform;
   partitioning the imaging light and color measurement system into a plurality of regions when the stray light is non-uniform;
   retrieving a unique correction value for each of the regions and subtracting the unique correction value from the gray scale value for each corresponding pixel by the software.

21. The stray light correction method according to claim 12, further comprising the following steps:
   determining whether a stray light incident into the imaging light and color measurement system is uniform; and
   subtracting the same correction value from the gray level value for each of the pixels by the software.

* * * * *